United States Patent [19]

Proudman

[11] Patent Number: 5,769,108

[45] Date of Patent: Jun. 23, 1998

[54] FLUID MEASURING, DILUTION AND DELIVERY SYSTEM WITH AIR LEAKAGE MONITORING AND CORRECTION

[76] Inventor: Donald L. Proudman, c/o Proudman Systems, 30 Waverley St., Taunton, Mass. 02780

[21] Appl. No.: 437,325

[22] Filed: May 9, 1995

[51] Int. Cl.⁶ .................................................. G05D 11/13
[52] U.S. Cl. ............................... 137/7; 137/114; 137/557
[58] Field of Search ................................... 137/3, 7, 113, 137/111, 114, 557; 417/26, 29

[56] References Cited

U.S. PATENT DOCUMENTS

| | | | |
|---|---|---|---|
| 3,420,637 | 1/1969 | Halff et al. | 137/7 X |
| 4,180,374 | 12/1979 | Bristow | 417/26 X |
| 5,129,415 | 7/1992 | Runyon et al. | 137/113 |
| 5,139,045 | 8/1992 | Ensign | 137/114 |
| 5,246,026 | 9/1993 | Proudman | 137/3 |

*Primary Examiner*—Stephen M. Hepperle
*Attorney, Agent, or Firm*—Edwin H. Paul; Perkins, Smith & Cohen, LLP

[57] ABSTRACT

A device for automatic dilution of chemical additives and water utilizing a single pump (20) drawing water and other chemical additives through a dilution manifold (10). The introduction of air into the system is monitored such that the system performance is not impaired. If the air leak is small corrections can be made, and if the air leak is large, the system will shut down and activate an indication or alarm to signify that some malfunction has occurred, such as a chemical supply is unconnected or empty.

4 Claims, 1 Drawing Sheet

FLUID MEASURING, DILUTION AND DELIVERY SYSTEM WITH AIR LEAKAGE MONITORING AND CORRECTION

CROSS REFERENCE TO RELATED PATENTS

This patent application is closely related to U.S. Pat. No. 5,246,026 entitled FLUID MEASURING, DILUTION AND DELIVERY SYSTEM, which issued on Sep. 21, 1993. This patent is of common inventorship and assignment, and is herein incorporated by reference as if laid out in full.

FIELD OF THE INVENTION

The present invention relates generally to automatic systems for delivery and dilution of liquid chemicals and water for the cleaning industry and in like applications in other industries. In particular, the present invention relates to systems where air may be found in the fluid paths causing fluid dispensing errors.

BACKGROUND OF THE INVENTION

In the cleaning industry there is a need to handle a wide range of liquid chemical, including alkalis, detergents, bleaches, acids and the like. These chemicals have a variety of viscosities and concentrations requiring dilution, usually with water, before use.

In use, the specific proportions of the various chemicals delivered must be controlled for efficiency, performance, repeatability and low cost. If air leaks into any fluid flow stream, the air will cause fluid flow measurement errors as the air travels through the flow meters. These errors will result in improper proportions of the delivered liquid mixture. Such air leakage into the flow measurements is a limitation of the presently available liquid mixture delivery systems.

As referenced above, the introduction of air into the prior art systems results in non-uniform fluid mixtures and, ultimately, in poor cleaning performance.

An object of this invention is to produce a system where volumes of fluid chemical additives are reliably achieved even with air volumes being introduced into the system.

Another object of this invention is to stop the dispensing system when an air leak occurs that cannot be automatically corrected.

It is a further object of this invention to provide a system with fewer service requirements and long life.

SUMMARY OF THE INVENTION

The foregoing objects are met by adding a vacuum sensor or device to existing systems. Such a system may include a pump, flow meters, valves, adjustable flow orifices in the feed lines, and with the vacuum sensor positioned to detect an air leak by sensing a pressure change. The vacuum sensor provides a pressure measurement that can be used to determine which manual or automatic corrective action should be taken.

In a preferred embodiment, the vacuum sensor is positioned just upstream from the totalizing flowmeter. When air enters the fluid system it will be quickly perceived by the vacuum detector as an abrupt loss of vacuum. The system controller is arranged to monitor and react to the pressure change such that precision of the fluid mixture is preserved, or to stop the system if correction cannot be made and cause an alarm to be activated indicating the need for service.

Other objects, features and advantages will be apparent from the following detailed description of preferred embodiments thereof taken in conjunction with the accompanying drawing in which: BRIEF DESCRIPTION OF THE DRAWINGS FIG. 1 is a schematic/block diagram of a preferred embodiment of the present invention with the added vacuum sensor.

DETAILED DESCRIPTION OF PREFERRED EMBODIMENTS

Figure 1:
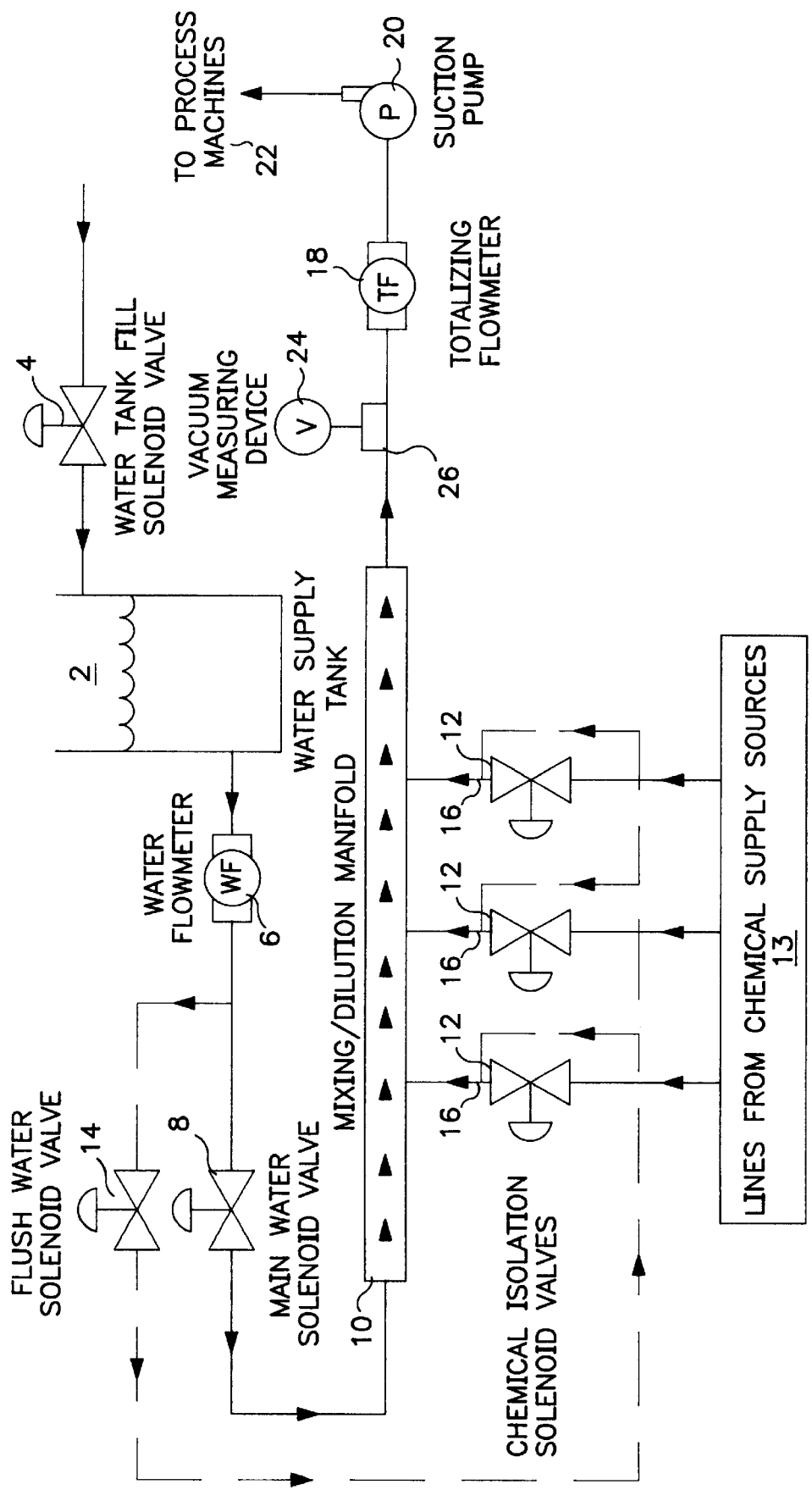

In FIG. 1, a fluid solution and measuring system, according to the present invention, is shown where a water reservoir is filled from a supply via a solenoid valve 4. This supply water is usually at 90° F., but other higher and lower temperatures can be used to advantage with the present invention. Water from the supply reservoir is measured by a flowmeter 6, as the water travels through the main water solenoid valve 8 to the mixing/dilution manifold 10. Supplies of chemical additives are attached to the dilution manifold 10 via the valves 12. The system controller (not shown) activates the pump 20 which sucks the water and the additives and measures the water and the total flow via the flow meters 6 and 18, respectively. A flush valve 14 is provided to flush out the lines feeding the individual chemical additives. The water flush line connects on the manifold side 16 of the chemical valves 12. A suction pump 20 draws the mixture from the mixing/dilution manifold 10 and delivers the mixture to the process machines. A vacuum sensor 24 is arranged just upstream from the totalizing flowmeter. The vacuum sensor is isolated from the fluid mixture by an in-line guard 26. The preferred vacuum sensor is an adjustable vacuum switch type with a settable range of zero to minus (vacuum) 50 inches of mercury. However, other vacuum sensors e.g. diaphragms, and spring loaded types, can be used.

In this preferred operation the controller turns on the water pump and measures the volume flow to establish a base volume flow. At this time the reading on the vacuum sensor is the base line vacuum or pressure (although negative) value used as a reference for subsequent measurements. When a chemical pump is turned on, the total flow rate increase is a measure of the additive delivered when compared to the base flow rate.

In normal operation, and in a preferred embodiment, the flow meter provides a digital signal when a specific volume of fluid has passed through the flow meter, but analog flow meters, meters where the output signal indicates flow rate, and "smart" totalizing flow meters, where the meter will output a signal indicating the total flow through the meter when queried (sampled) and/or the meter will accept an total flow input and output a signal when that flow was achieved may be used in the present invention. In addition flow meters with optical interfaces are provided in another preferred embodiment. The rest of the system would be changed to accommodate these other types of flow meters and the like.

Preferably, the system controller is a computer, preferably including a microprocessor, with supporting circuitry and programming which controls the dilution system of the present invention while also controlling the distribution of the mixture to coordinating machinery associated with the total washing or processing system. In other preferred embodiments, the controller may be a remote large computer that controls the entire facility operation, or small computers networked, or sequential time based controllers. Many other preferred controller designs, known in the art, may be used to advantage within this invention.

The flow meters 6 and 18 provide a pulse when a given volume is delivered through the flow meter. In this preferred embodiment the dilution with water allows the pump and flow meters to function within their specifications. The flow meters are linear when operating within their specifications for viscosity and flow; the flow rate specification for the flow meters used in a preferred embodiment are from about 0.5 to about 6 gallons per minute, other preferred embodiments utilize meters with flow rates from about 1.0 to over about 30 gallons per minute, and the adjustment for the orifices involved allow the chemical to be diluted with water to keep the flow rates and viscosities within the specifications of the flow meters involved. The pumps are sized to accommodate the flow rate characteristics of the meters.

A typical sequence of operation is:

1) A request for a specific volume of a particular chemical is input to the system controller from a user machine (not shown) or from a process machine or manually.

2) The pump is turned on drawing water from the supply through the water flow meter 6, through the dilution manifold 10, through the totalizing flow meter 18 to the input side of the pump 20 and then out to the process system.

3.1) The orifices for the various chemicals were previously set to accommodate the viscosity and flow rate range for each chemical to be used.

3.2) The orifice size for the water flow meter is calculated and adjusted to provide a minimum flow of water for dilution and to guarantee flow meter operation.

4) With all chemical valves off only water flows through both meters which are measured by the controller which ensures that the flow meters are functioning properly, and are within an acceptable tolerance of each other. An alarm will be activated if they are out of tolerance.

5) The appropriate chemical valve is opened and that chemical is drawn through the dilution manifold 10 and mixed with the water flow stream.

6) The chemical adds to the water stream and the flow through the totalizing flow meter increases, the flow through the water flow meter 6 may decrease depending upon the water orifice size, the chemical orifice size, the pump volume and the mixing characteristics of the water and chemical involved.

7) The controller monitors the volume through both flow meters, calculates the difference between the flow meters and thereby determines the individual volumes of the water and the chemical being delivered by the pump.

8) The controller keeps the valve open until the desired volume of chemical has been delivered. Specifically, the corrected volume difference from step 7 is a digital volumetric measure of the chemical being delivered.

9) After the valve is closed the water will flush out the main delivery lines and the dilution manifold. The volume of flush water may also be controlled.

In practice the pump may change its delivery rate, but since the system measures the corrected difference between the flow meters the pump variation is canceled, and, similarly, the chemical introduction may vary without affecting the system volume delivery accuracy.

As previously described, the prior art systems, in contrast to the above invention, introduce errors if air enters the delivery tubes involved.

Since the connections to the chemical supplies may be changed more often, it is most likely that air leaks will occur in these lines. Most typical problems are inadvertent loose or defective fittings connecting the supplies to the manifold.

When air enters the lines the vacuum sensor quickly registers a loss of vacuum. If the vacuum loss persists it is likely that a chemical supply is empty and requires intervention to replenish the chemical supply. If the vacuum loss is short the system controller can determine the loss and accept the change as within tolerances that will cause no short term problems, or the controller in another instance may be able to correct for the air by changing the proportions for some short time with out impairing the system performance. For example, referring to FIG. 1, the quantity of water will be known, and the air leak in a chemical supply fitting will cause the loss of vacuum that is measured. The controller can also measure the time that the vacuum loss existed. The lost chemical can be compensated by increasing the quantity of chemical supplied, by controlling the orifices and valves (not shown) for a time period calculated by the controller to bring the amount of chemical delivered back to the programmed amount. However, if the air leak is long it is most likely that manual correction is required and the system will shut down and cause an alarm to make the personnel aware of a problem. In such a case chemicals can be added manually to compensate for the loss. If several chemicals are being added, the system may simply shut down and cause an alarm or other such indication to be active immediately, as the location of the leak would not be known so which chemical (or chemicals) was missing would not be known. Of course other arrangements with multiple vacuum sensors could be implemented which would selectively monitor each chemical supply for air leaks.

Other types of vacuum sensors may be used in other preferred embodiments. Those sensors include optical sensors that "see" a void, ultrasonic types that detect changes in density that indicate the presence of air, and other types of venturi column meters. A continuously reading or analog vacuum sensor is used in systems where more precision may be needed, and the computer or microprocessor controller can be programmed for complex and precise flow and mixing control and leak detection However, these types of systems are more costly and an adjustable vacuum switch is the preferred implementation for most commercial systems.

Air in the present inventive system will cause the greatest loss of vacuum or pressure when the air is at the vacuum sensor. When the air is distant from the sensor less of a pressure loss will be recorded at the sensor. In addition the amount of air will affect the pressure readings.

EXAMPLE

A system was built where the system pressure at the vacuum sensor, during air-leak free operation throughout an entire delivery cycle remained at 18 to 22 inches of mercury as read on a vacuum gauge. The 22 inches represents a pressure less (therefore more of a vacuum) than atmospheric pressure at sea level, since the gauge is referenced to sea level pressure. Also, note that loss of the vacuum is measured by the pressure reading going toward zero inches of mercury. A single chemical was being mixed with water and delivered by the mix/dilution manifold. The output of the manifold was fed to a vacuum gauge, the gauge was about 24 inches from the pump inlet. The pump was a double diaphragm type. This system was programmed to bring in 20 oz of chemical, but chemical inlet port was opened to the atmosphere so that air not the chemical was ingested into the system. Under these conditions the pressure reading that previously read 18 inches went to 4 inches of mercury; when 10 oz of the chemical was programmed, but still air was ingested the reading went to 7 inches; and correspondingly for 4 oz the reading went to 12 inches; 3 oz produced 13 inches; 2 oz produced 14 inches and 1 oz produced 18 inches. These reading show that detection of an open chemical port, where the system was programmed to bring in between 1 and 2 oz produced a loss of vacuum of up to 4 inches which is easily set up for detection on a vacuum switch. In practice a test operation may be run to establish the non-leak low pressure level and set the adjustable vacuum switch referenced to this starting level.

Mechanical or electrical pulse dampeners may be introduced to reduce the observed and measured flow pulsations due to any specific pumping system. The flow pulsations produce pressure changes which must be low enough so as not to trigger the vacuum leak detection.

It will now be apparent to those skilled in the art that other embodiments, improvements, details and uses can be made consistent with the letter and spirit of the foregoing disclosure and within the scope of this patent, which is limited only by the following claims, construed in accordance with the patent law, including the doctrine of equivalents.

What is claimed is:

1. In a liquid dilution and delivery system comprising:
   means for diluting with at least a first and a second fluid input and one fluid output, wherein said fluids entering said inputs co-mingle and flow out from the fluid output,
   means for determining the volume flow of at least one of the fluid inputs,
   means for pumping fluids through said manifold,
   means for determining the total fluid volume delivered,
   means for detecting pressure changes within the co-mingled flow,
   means for relating said pressure changes to air entering at, at least one of the fluid inputs,
   means for relating the measured pressure drop and the time that said pressure drop exists for calculating a volume flow error, responsive to said volume flow error, means for shutting down said system and means for indicating said shutdown.

2. Liquid dilution and delivery system comprising:
   means for diluting with at least a first and a second fluid input and one fluid output, wherein said fluids entering said inputs co-mingle and flow out from the fluid output,
   means for determining the volume flow of at least one of the fluid inputs,
   means for pumping fluids through said manifold,
   means for determining the total fluid volume delivered,
   means for detecting pressure changes within the co-mingled flow,
   means for relating said pressure changes to air entering at at least one of the fluid inputs,
   means for measuring the pressure drop and the time that said pressure drop exists,
   means for controlling the flow of the first fluid input,
   means for calculating, from the measured pressure drop and time, a volume flow error at the first fluid input, and
   means to correct said volume flow error by increasing the flow of said first fluid input for a corresponding time.

3. A process for liquid dilution and delivery comprising the steps of:
   (a) diluting at least two fluid inputs and outputting the co-mingled flow,
   (b) pumping liquid said co-mingled flow,
   (c) measuring the volume flow of at least one of the fluid inputs being diluted with a first flow meter,
   (d) measuring the total volume being pumped with a second flow meter,
   (e) controlling the pumping,
   (g) detecting air entering at least one of the fluid inputs
   (h) measuring pressure drop and the time that said pressure drop exists, for calculating a volume flow error, and
   (i) responsive to said volume flow error, shutting down said system, and
   (k) indicating said shutdown.

4. A process for liquid dilution and delivery comprising the steps of:
   (a) diluting at least two fluid inputs and outputting the co-mingled flow,
   (b) pumping liquid said co-mingled flow,
   (c) measuring the volume flow of at least one of the fluid inputs being diluted with a first flow meter,
   (d) measuring the total volume being pumped with a second flow meter,
   (e) controlling the pumping,
   (g) detecting air entering at least one of the fluid inputs,
   (h) measuring the pressure drop and the time that said pressure drop exists,
   (i) controlling the flow at said first fluid input,
   (j) calculating from the measured pressure drop and time a volume flow error of the first fluid input, and
   (k) correcting said volume flow error by increasing the flow of said first fluid input for a corresponding time.

* * * * *